US010900686B2

(12) United States Patent
Willmott et al.

(10) Patent No.: US 10,900,686 B2
(45) Date of Patent: Jan. 26, 2021

(54) CENTRAL PLANT CONTROL SYSTEM WITH TIME DEPENDENT DEFERRED LOAD

(71) Applicant: Johnson Controls Technology Company, Auburn Hills, MI (US)

(72) Inventors: Graeme Willmott, West Milwaukee, WI (US); John H. Burroughs, Wauwatosa, WI (US); Mohammad N. ElBsat, Milwaukee, WI (US); Michael J. Wenzel, Grafton, WI (US); Matthew J. Asmus, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 168 days.

(21) Appl. No.: 16/048,092

(22) Filed: Jul. 27, 2018

(65) Prior Publication Data
US 2019/0032943 A1 Jan. 31, 2019

Related U.S. Application Data

(60) Provisional application No. 62/538,507, filed on Jul. 28, 2017.

(51) Int. Cl.
*F24F 11/46* (2018.01)
*G05B 15/02* (2006.01)
(Continued)

(52) U.S. Cl.
CPC ............ *F24F 11/46* (2018.01); *F24F 11/30* (2018.01); *F24F 11/62* (2018.01); *F24F 11/64* (2018.01);
(Continued)

(58) Field of Classification Search
CPC .. F24F 11/46; F24F 11/62; F24F 11/65; F24F 11/30; G05B 13/041; G05B 13/048; G05B 15/02
(Continued)

(56) References Cited

U.S. PATENT DOCUMENTS 7,580,775 B2 8/2009 Kulyk et al.
7,894,946 B2 2/2011 Kulyk et al.
(Continued)

FOREIGN PATENT DOCUMENTS

WO WO-2017/062898 A1 4/2017

OTHER PUBLICATIONS

Extended European search report on application No. 18186163.4 dated Jan. 15, 2019. 7 pages.
(Continued)

*Primary Examiner* — Mohammad Ali
*Assistant Examiner* — Joshua T Sanders
(74) *Attorney, Agent, or Firm* — Foley & Lardner LLP

(57) ABSTRACT

In one aspect, a system for operations an energy plant obtains thermal energy load allocation data indicating time dependent thermal energy load of the energy plant. The system determines, for a time period, an operating state of the energy plant from a plurality of predefined operating states based on the thermal energy load allocation data. The system determines operating parameters of the energy plant according to the determined operating state. The system operates the energy plant according to the determined operating parameters.

17 Claims, 8 Drawing Sheets

(51) Int. Cl.
| | |
|---|---|
| *G05B 13/04* | (2006.01) |
| *F24F 11/64* | (2018.01) |
| *F24F 11/65* | (2018.01) |
| *F24F 11/62* | (2018.01) |
| *F24F 11/30* | (2018.01) |
| *F24F 140/50* | (2018.01) |
| *F24F 140/00* | (2018.01) |

(52) U.S. Cl.
CPC ............ *F24F 11/65* (2018.01); *G05B 13/041* (2013.01); *G05B 13/048* (2013.01); *G05B 15/02* (2013.01); *F24F 2140/00* (2018.01); *F24F 2140/50* (2018.01); *G05B 2219/2642* (2013.01)

(58) Field of Classification Search
USPC ........................................................ 700/276
See application file for complete search history.

(56) References Cited

U.S. PATENT DOCUMENTS

| | | | | |
|---|---|---|---|---|
| 8,424,336 | B2* | 4/2013 | Bean, Jr. ................... | F25D 3/00 62/434 |
| 8,527,108 | B2 | 9/2013 | Kulyk et al. | |
| 8,527,109 | B2 | 9/2013 | Kulyk et al. | |
| 8,903,554 | B2 | 12/2014 | Stagner | |
| 8,918,223 | B2 | 12/2014 | Kulyk et al. | |
| 9,110,647 | B2 | 8/2015 | Kulyk et al. | |
| 9,703,339 | B2 | 7/2017 | Kulyk et al. | |
| 10,139,877 | B2 | 11/2018 | Kulyk et al. | |
| 2008/0022713 | A1* | 1/2008 | Jacobi ................... | F24F 5/0017 62/434 |
| 2012/0232701 | A1 | 9/2012 | Carty et al. | |
| 2015/0316902 | A1 | 11/2015 | Wenzel et al. | |
| 2017/0212488 | A1 | 7/2017 | Kummer et al. | |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: a Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

* cited by examiner

CENTRAL PLANT CONTROL SYSTEM WITH TIME DEPENDENT DEFERRED LOAD

CROSS-REFERENCE TO RELATED PATENT APPLICATION

This application claims the benefit of U.S. Provisional Patent Application No. 62/538,507, filed Jul. 28, 2017, which is incorporated herein by reference in its entirety.

BACKGROUND

The present disclosure relates generally to the operation of a central plant for serving building thermal energy loads. The present disclosure relates more particularly to systems and methods for optimizing the operation of one or more subplants of a central plant.

A heating, ventilation and air conditioning (HVAC) system may include various types of equipment configured to serve the thermal energy loads of a building or building campus. For example, a central plant may include HVAC devices such as heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

Controlling the central plant includes determining a set of operating parameters of the HVAC devices. In particular, some HVAC device operates according to a selected operating parameter from a range of operating parameters. Examples of the operating parameters include operating capacity (e.g., 50% capacity) of corresponding HVAC devices. Determining a set of operating parameters includes, for a candidate set of operating parameters, predicting thermodynamic states (e.g., pressure values, temperatures values, mass flow values, etc.) of different HVAC devices in operation together, and predicting power consumption of the central plant based on the predicted thermodynamic states. By comparing power consumptions of different candidate sets of operating parameters, a candidate set with the lowest power consumption may be determined as the set of operating parameters.

One conventional approach of predicting power consumption of a central plant is based on a flow of liquid or gas through a load device. In one example, power consumption of a central plant may be predicted according to a temperature difference between an outlet and an inlet of a load device due to the flow of liquid or gas. However, a status of a device in the energy plant may change thereby rendering a flow through the load device to be difficult to measure. For example, a supply device supplying resources (e.g., gas or liquid) may be turned off or disabled during a time period, thus determining a flow through the load device and determining power consumption due to the flow may not be trivial. Accordingly, assigning load to the energy plant at different time periods may be challenging.

SUMMARY

Various embodiments of a controller for an energy plant are disclosed. The controller includes a processing circuit comprising a processor and memory storing instructions executed by the processor. The processing circuit is configured to obtain thermal energy load allocation data indicating time dependent thermal energy load of the energy plant. The processing circuit is configured to determine, for a time period, an operating state of the energy plant from a plurality of predefined operating states based on the thermal energy load allocation data. The processing circuit is configured to determine operating parameters of the energy plant according to the determined operating state. The processing circuit is configured to operate the energy plant according to the determined operating parameters.

In one or more embodiments, the plurality of predefined operating states include a primary state, in which a supply device of the energy plant is enabled and a deferred load is allocated during the time period; a deferred state, in which the supply device of the energy plant is disabled and the deferred load is allocated during the time period; and an off-state, in which no load is allocated during the time period.

In one or more embodiments, the processing circuit is further configured to predict a power consumption of the energy plant according to the determined operating state. The operating parameters of the energy plant may be determined according to the predicted power consumption.

In one or more embodiments, responsive to determining that the operating state is the primary state, the processing circuit is configured to predict the power consumption of the energy plant according to a power consumption of the supply device.

In one or more embodiments, responsive to determining that the operating state is the deferred state, the processing circuit is configured to predict a flow of gas or liquid through a load device to consume the deferred load during the time period; and predict the power consumption according to the predicted flow of gas or liquid.

In one or more embodiments, the processing circuit is configured to generate a schematic data of the energy plant. The schematic data may include a model of a water mass storage in place of the supply device and a model of a load device to consume the deferred load. The processing circuit may be configured to predict a temperature difference in a loop formed by the model of the water mass storage and the model of the load device. The processing circuit may be configured to predict the flow of gas or liquid through the load device according to the predicted temperature difference.

In one or more embodiments, responsive to determining that the operating state is the off-state, the processing circuit is configured to determine that the supply device does not consume power during the time period.

In one or more embodiments, the processing circuit is further configured to determine, for another time period, another operating state of the energy plant from the plurality of predefined operating states based on the thermal energy load allocation data; and predict another power consumption of the energy plant according to the another operating state.

In one or more embodiments, the processing circuit is further configured to compare the power consumption and the another power consumption; and assign the time dependent thermal energy load to the energy plant for one of the time period and the another time period associated with a lower power consumption from the comparison. The operating parameters of the energy plant may be determined according to the assigned time dependent thermal energy load.

Various embodiments of method of operating an energy plant are disclosed herein. The method includes obtaining thermal energy load allocation data indicating time dependent thermal energy load of the energy plant. The method further includes determining, for a time period, an operating state of the energy plant from a plurality of predefined operating states based on the thermal energy load allocation data. The method further includes determining operating parameters of the energy plant according to the determined operating state. The method further includes operating the energy plant according to the determined operating parameters.

In one or more embodiments, the plurality of predefined operating states include a primary state, in which a supply device of the energy plant is enabled and a deferred load is allocated during the time period; a deferred state, in which the supply device of the energy plant is disabled and the deferred load is allocated during the time period; and an off-state, in which no load is allocated during the time period.

In one or more embodiments, the method further includes predicting a power consumption of the energy plant according to the determined operating state. The operating parameters of the energy plant may be determined according to the predicted power consumption.

In one or more embodiments, the method further includes predicting the power consumption of the energy plant according to a power consumption of the supply device, responsive to determining that the operating state is the primary state.

In one or more embodiments, responsive to determining that the operating state is the deferred state, the method further includes predicting a flow of gas or liquid through a load device to consume the deferred load during the time period; and predicting the power consumption according to the predicted flow of gas or liquid.

In one or more embodiments, the method further includes generating a schematic data of the energy plant. The schematic data may include a model of a water mass storage in place of the supply device and a model of a load device to consume the deferred load. The method may further include predicting a temperature difference in a loop formed by the model of the water mass storage and the model of the load device. The method may further include predicting the flow of gas or liquid through the load device according to the predicted temperature difference.

In one or more embodiments, the method further includes, responsive to determining that the operating state is the off-state, determining that the supply device does not consume power during the time period.

In one or more embodiments, the method further includes determining, for another time period, another operating state of the energy plant from the plurality of predefined operating states based on the thermal energy load allocation data, and predicting another power consumption of the energy plant according to the another operating state.

In one or more embodiments, the method further includes comparing the power consumption and the another power consumption; and assigning the time dependent thermal energy load to the energy plant for one of the time period and the another time period associated with a lower power consumption from the comparison. The operating parameters of the energy plant may be determined according to the assigned time dependent thermal energy load.

Various embodiments of a non-transitory computer readable medium comprising instructions for operating an energy plant are disclosed. The instructions when executed by a processor cause the processor to: obtain thermal energy load allocation data indicating time dependent thermal energy load of an energy plant; determine, for a time period, an operating state of the energy plant from a plurality of predefined operating states based on the thermal energy load allocation data; determine operating parameters of the energy plant according to the determined operating state; and operate the energy plant according to the determined operating parameters.

In one or more embodiments, the plurality of predefined operating states include a primary state, in which a supply device of the energy plant is enabled and a deferred load is allocated during the time period; a deferred state, in which the supply device of the energy plant is disabled and the deferred load is allocated during the time period; and an off-state, in which no load is allocated during the time period.

DETAILED DESCRIPTION

Overview

Figure 1:
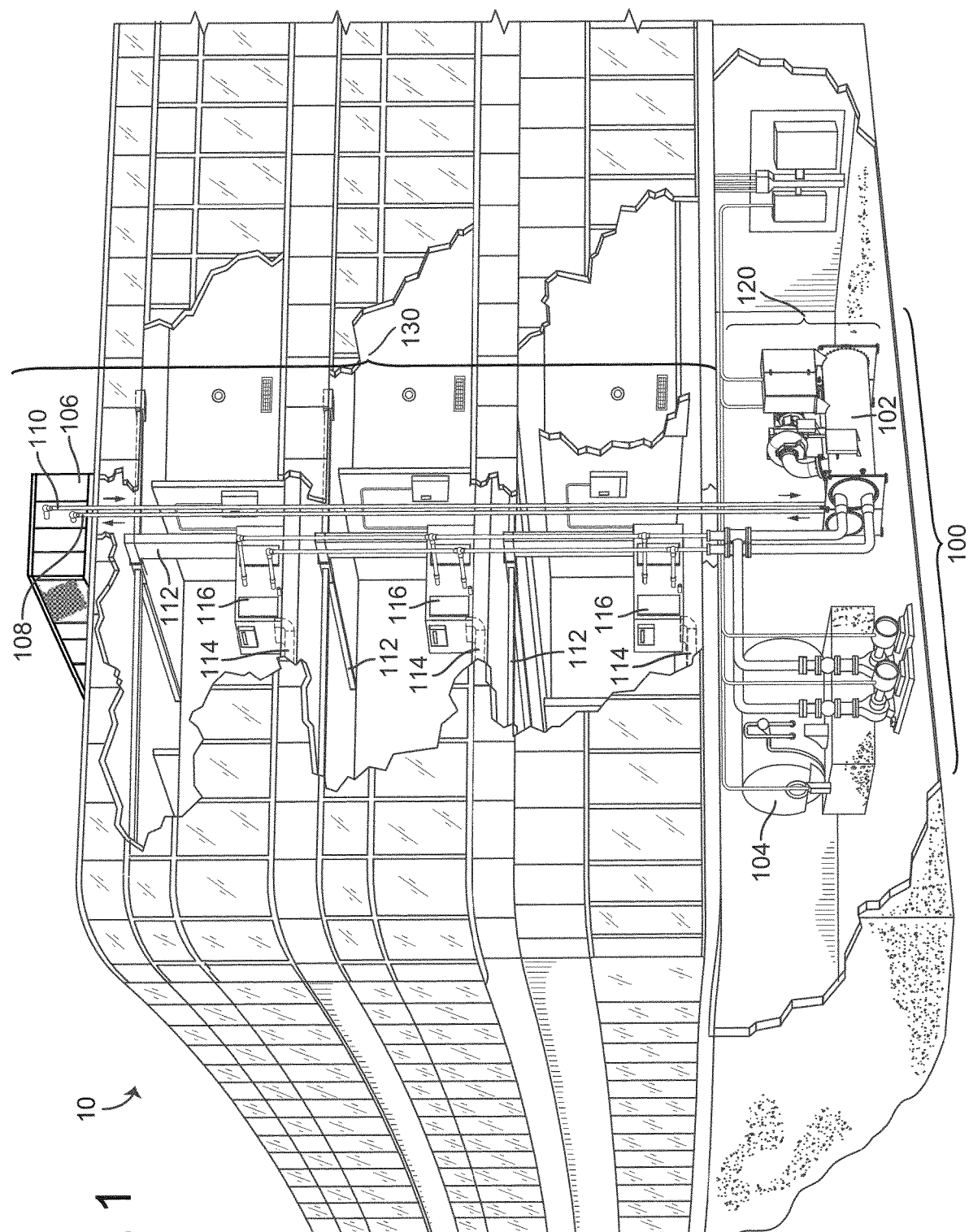
FIG. 1 is a drawing of a building equipped with an HVAC system, according to some embodiments.

Referring generally to the FIGURES, disclosed herein are systems and methods for operating the HVAC system based on time dependent deferred load.

Various embodiments of a system, a method, and a non-transitory computer readable medium for operating an energy plant (also referred to as "a central plant") are disclosed herein. In some embodiments, a system includes a controller that operates the HVAC system according to time dependent thermal energy load. In one aspect, the controller obtains thermal energy load allocation data indicating time dependent thermal energy load, and determines, for a time period, an operating state of the energy plant based on the thermal energy load allocation data. The controller may determine operating parameters of the energy plant according to the determined operating state, and operate the energy plant according to the operating parameters.

In some embodiments, the operating state of the energy plant may be one of a primary state, a deferred load state, and an off-state. In the primary state, a primary equipment (also referred to as "a supply device" herein) of the energy plant is enabled during the time period. The primary equipment may be an equipment that produces resource (Chilled Water or Hot Water) of a loop. Hence, the power consumption of the energy plant operating in the primary state can be determined according to the primary equipment in operation. In the deferred load state, the primary equipment is disabled, but a deferred load may be allocated. For the deferred load state, a flow through a loop of the energy plant due to the deferred load can be predicted, and the power consumption of the energy plant can be determined according to the predicted flow. In the off-state, the primary equipment of the energy plant is disabled without any deferred load. Hence, a portion the HVAC system or HVAC devices of the HVAC system coupled to the primary equipment of the energy plant may be determined to be non-operational.

In some embodiments, the disclosed system, method, and non-transitory computer readable medium allow prediction of power consumption of an energy plant even in the deferred load state. In some cases, a status of a device in the energy plant may change thereby rendering a flow through a load device of the energy plant to be difficult to measure. For example, a supply device supplying resources (e.g., gas or liquid) in the deferred load state may be turned off or disabled during a time period. In one aspect, the system generates a schematic data representing schematic relationships of components of the energy plant. The schematic data of the energy plant may include (i) a computer generated model of a dummy device in place of the disabled supply device and (ii) a computer generated model of the load device to consume the deferred load. A flow through the load device may be predicted based on the schematic data including the computer generated model of the dummy device. Hence, power consumption of the energy plant operating in the deferred load state can be predicted based on the predicted flow.

Advantageously, thermal energy load may be assigned to a load device of the energy plant at a time period that allows the energy plant to operate in a power efficient manner. The system compares power consumptions of the energy plant operating according to the thermal energy load assigned at different time periods. Because the disclosed system allows prediction of the power consumptions of the energy plant in different operating states in different time periods, the disclosed system enables the thermal energy load to be assigned to the energy plant at a time period that renders a lower power consumption, and to operate the energy plant accordingly.

Building and HVAC System

Figure 2:
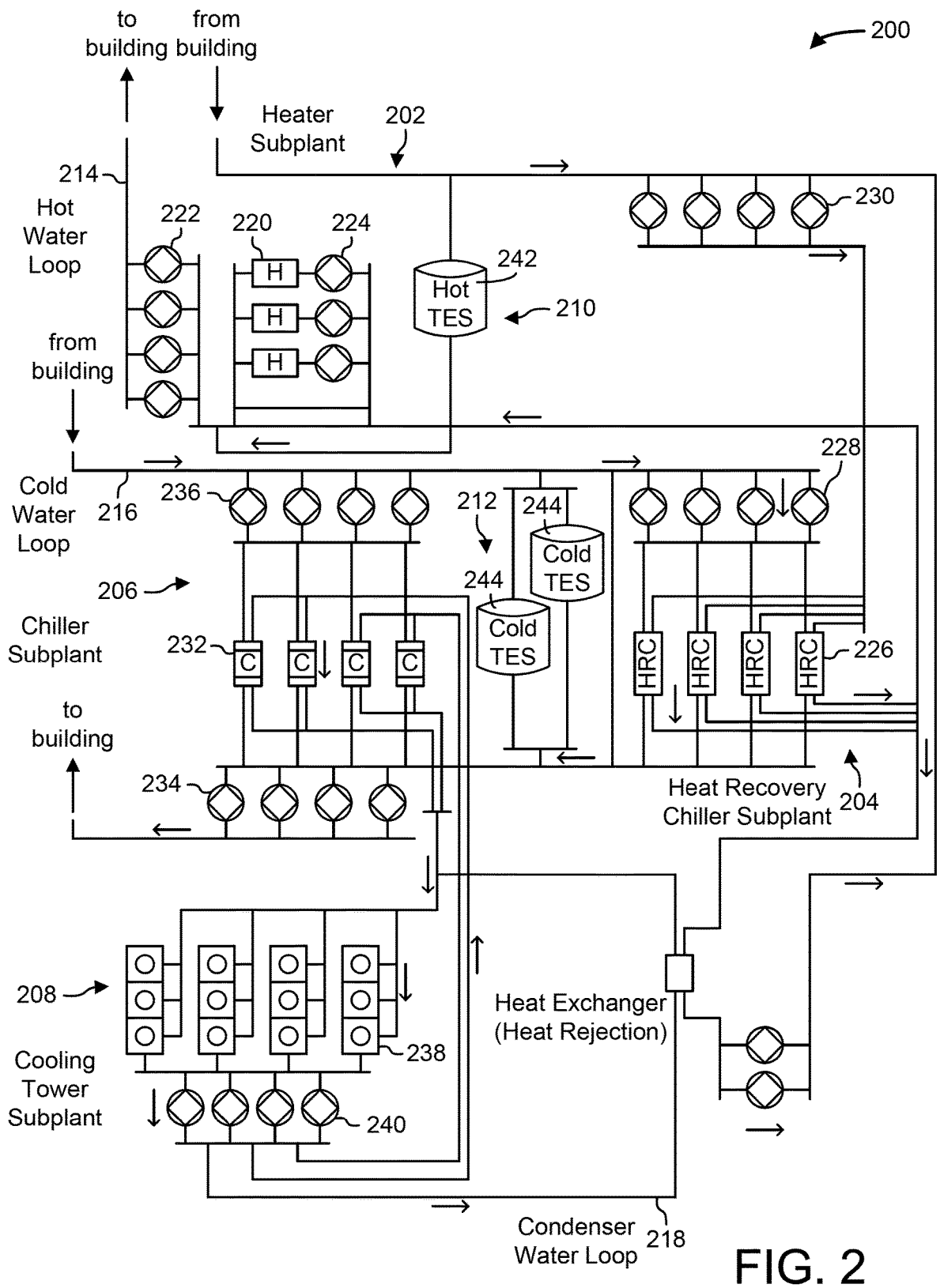
FIG. 2 is a schematic of a waterside system, which can be used as part of the HVAC system of FIG. 1, according to some embodiments.
Figure 3:
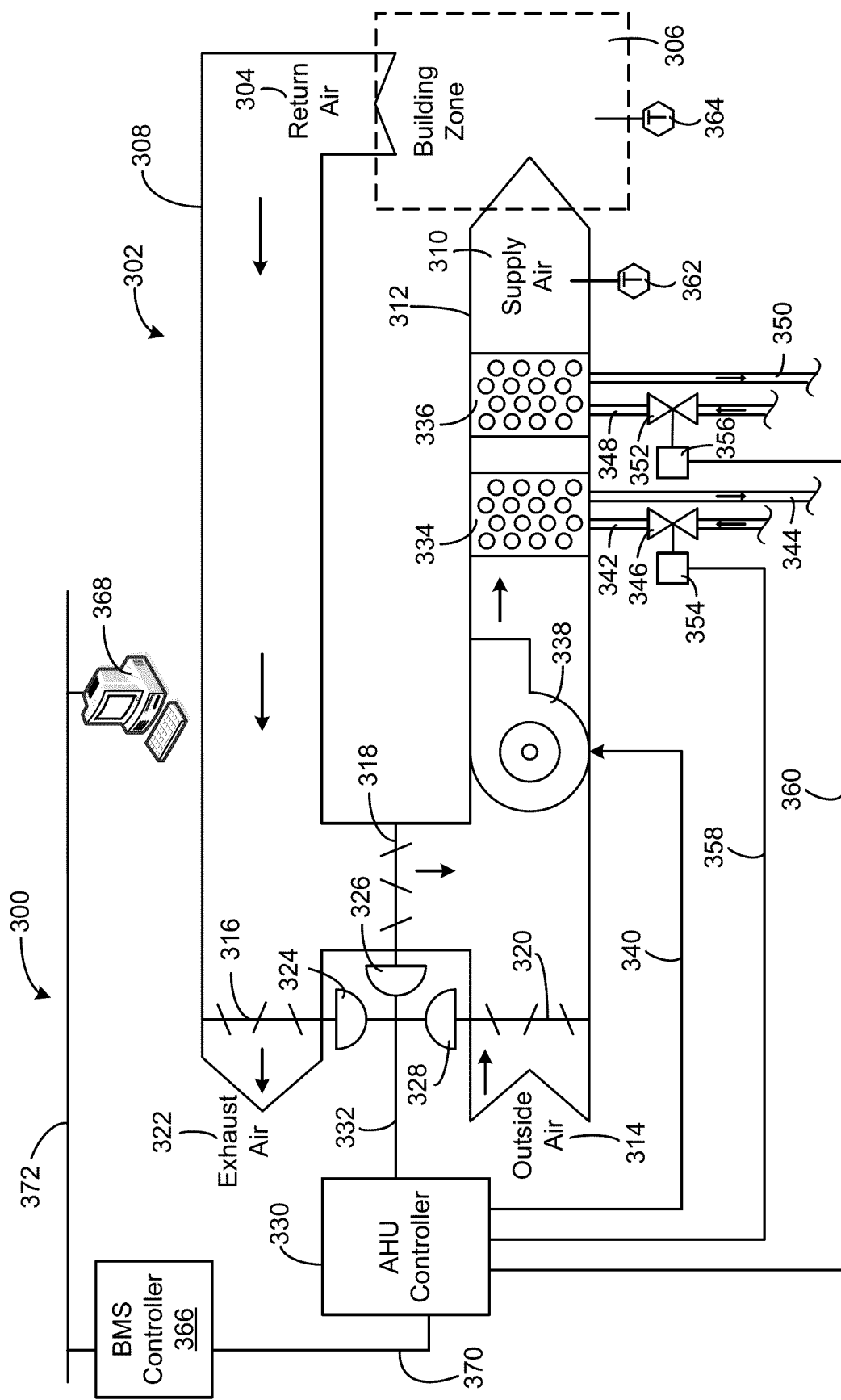
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4:
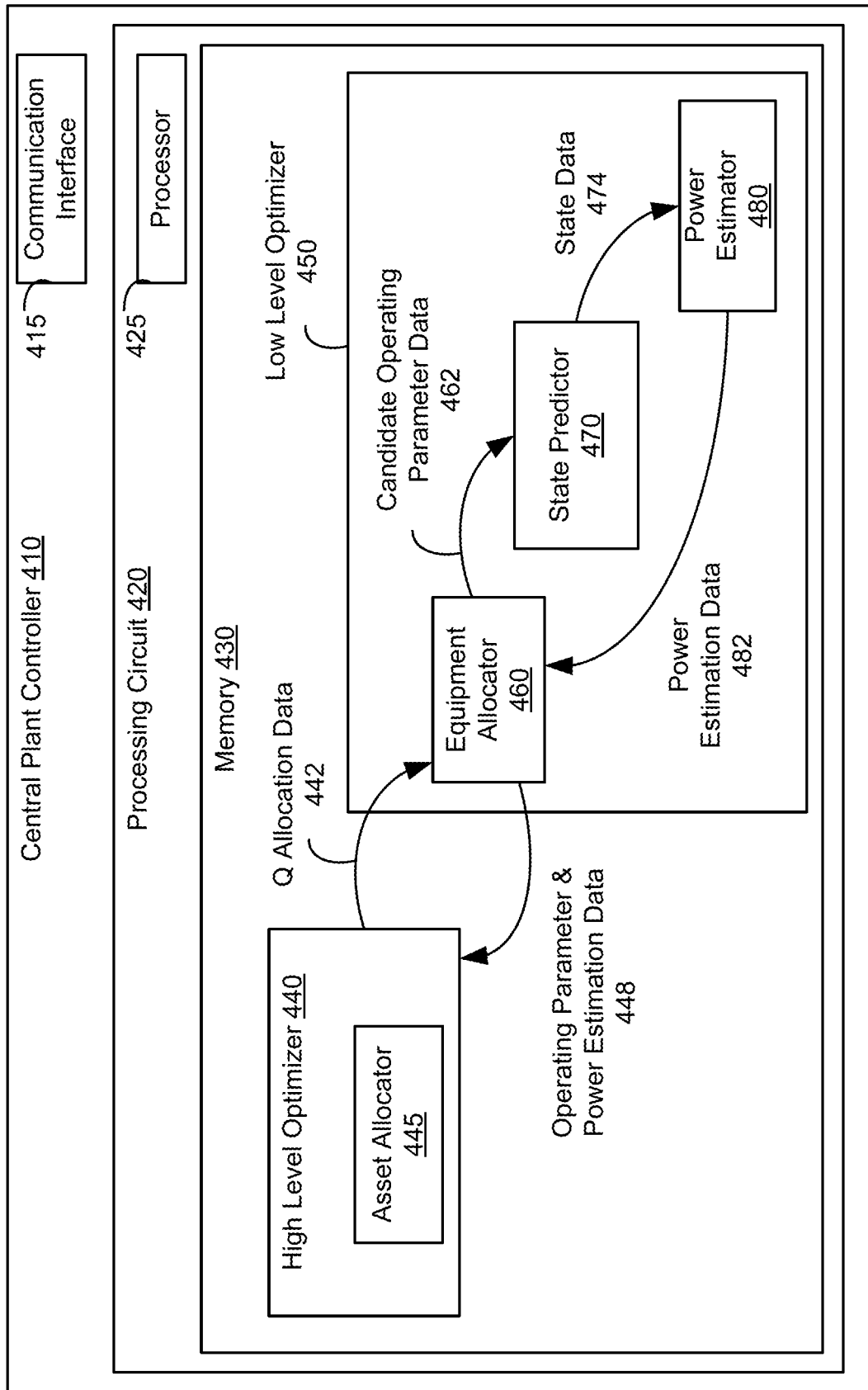
FIG. 4 is a block diagram of a central plant controller which can be used to control the HVAC system of FIG. 1, the waterside system of FIG. 2, and/or the airside system of FIG. 3, according to some embodiments.

Referring to FIG. 4, illustrated is a block diagram of a central plant controller 410, according to some embodiments. In some embodiments, the central plant controller 410 is part of the HVAC system 100 of FIG. 1. Alternatively, the central plant controller 410 is coupled to the HVAC system 100 through a communication link. The central plant controller 410 may be the AHU controller 330 of FIG. 3, or a combination of the BMS controller 366 and the AHU controller 330 of FIG. 3. In one configuration, the central plant controller 410 includes a communication interface 415, and a processing circuit 420. These components operate together to determine a set of operating parameters for operating various HVAC devices of the HVAC system 100. In some embodiments, the central plant controller 410 includes additional, fewer, or different components than shown in FIG. 4.

The communication interface 415 facilitates communication of the central plant controller 410 with other HVAC devices (e.g., heaters, chillers, air handling units, pumps, fans, thermal energy storage, etc.). The communication interface 415 can be or include wired or wireless communications interfaces (e.g., jacks, antennas, transmitters, receivers, transceivers, wire terminals, etc.). In various embodiments, communications via the communication interface 415 can be direct (e.g., local wired or wireless communications) or via a communications network (e.g., a WAN, the Internet, a cellular network, etc.). For example, the communication interface 415 can include an Ethernet/USB/RS232/RS485 card and port for sending and receiving data through a network. In another example, the communication interface 415 can include a Wi-Fi transceiver for communicating via a wireless communications network. In another example, the communication interface 415 can include cellular or mobile phone communication transceivers.

The processing circuit 420 is a hardware circuit executing instructions to determine a set of parameters for operating HVAC devices of the HVAC system 100. In one embodiment, the processing circuit 420 includes a processor 425, and memory 430 storing instructions (or program code) executable by the processor 425. The memory 430 may be any non-transitory computer readable medium. In one embodiment, the instructions executed by the processor 425 cause the processor 425 to form software modules including a high level optimizer 440 and a low level optimizer 450. The high level optimizer 440 may determine how to distribute thermal energy loads across HVAC devices (e.g., subplants, chillers, heaters, valves, etc.) for each time step in the prediction window, for example, to minimize the cost of energy consumed by the HVAC devices. The low level optimizer 450 may determine how to operate each subplant according to the thermal energy loads determined by the high level optimizer 440. In other embodiments, the processor 425 and the memory 430 may be omitted, and the high level optimizer 440 and the low level optimizer 450 may be implemented as hardware modules by a reconfigurable circuit (e.g., field programmable gate array (FPGA)), an application specific integrated circuit (ASIC), or any circuitries, or a combination of software modules and hardware modules.

In one implementation, the high level optimizer 440 determines thermal energy loads of HVAC devices of the HVAC system 100, and generates Q allocation data 442 indicating the determined thermal energy loads. The high level optimizer 440 may provide the Q allocation data 442 to the low level optimizer 450. In return, the high level optimizer 440 may receive, from the low level optimizer 450, operating parameter and power estimation data 448 indicating a set of operating parameters to operate HVAC devices of the HVAC system 100, predicted power consumptions when operating the HVAC system 100 according to the set of operating parameters, or both. Based on the operating parameter and power estimation data 448, the high level optimizer 440 can operate the HVAC system 100 accordingly or generate different Q allocation data 442 for further optimization. The high level optimizer 440 and the low level optimizer 450 may operate together online in real time, or offline at different times.

In one implementation, the high level optimizer 440 determines a time period for allocating a thermal energy load of the HVAC system 100. In one approach, the high level optimizer 440 assigns the thermal energy load to the HVAC system 100 for a time period, and generates the Q allocation data 442 indicating the time period. The high level optimizer 440 provides the Q allocation data 442 to the low level optimizer 450. In return, the high level optimizer 440 receives the operating parameter and power estimation data 448 indicating operating parameters of the HVAC devices and predicted power consumption of the HVAC devices operating according to the thermal energy load at the time period. The high level optimizer 440 may assign the thermal energy load to the HVAC system 100 for different time periods, and obtain power consumptions of HVAC system 100 operating at different time periods. The high level optimizer 440 may compare power consumptions of the HVAC devices operating at different time periods, and select a time period, during which HVAC system is predicted to operate with a lower power consumption. The high level optimizer 440 may operate the HVAC system according to operating parameters of the HVAC devices at the selected time period to achieve power efficiency.

In one or more embodiments, the high level optimizer 440 includes an asset allocator 445 that determines a distribution of thermal energy loads of the HVAC devices of the HVAC system 100 based on a predicted thermal energy load of the HVAC system 100. In some embodiments, the asset allocator 445 determines the optimal load distribution by minimizing the total operating cost of HVAC system 100 over the prediction time window. In one aspect, given a predicted thermal energy load $\hat{l}_k$ and utility rate information received through a user input or automatically determined by a scheduler (not shown), the asset allocator 445 may determine a distribution of the predicted thermal energy load $\hat{l}_k$ across subplants to minimize the cost. The asset allocator 445 generates the Q allocation data 442 indicating the predicted loads $\hat{l}_k$ of different HVAC devices of the HVAC system 100 and provides the Q allocation data 442 to the low level optimizer 450.

In some embodiments, distributing thermal energy load includes causing TES subplants to store thermal energy during a first time step for use during a later time step. Thermal energy storage may advantageously allow thermal energy to be produced and stored during a first time period when energy prices are relatively low and subsequently retrieved and used during a second time period when energy prices are relatively high. The high level optimization may be different from the low level optimization in that the high level optimization has a longer time constant due to the thermal energy storage provided by TES subplants. The high level optimization may be described by the following equation:

$$\theta_{HL}^* = arg\ min_{\theta_{HL}} J_{HL}(\theta_{HL}) \qquad \text{Eq. (1)}$$

where $\theta_{HL}^*$ contains the optimal high level decisions (e.g., the optimal load $\dot{Q}$ for each of subplants) for the entire prediction period and $J_{HL}$ is the high level cost function.

To find the optimal high level decisions $\theta_{HL}^*$, the asset allocator 445 may minimize the high level cost function $J_{HL}$. The high level cost function $J_{HL}$ may be the sum of the economic costs of each utility consumed by each of subplants for the duration of the prediction time period. For example, the high level cost function $J_{HL}$ may be described using the following equation:

$$J_{HL}(\theta_{HL}) = \Sigma_{k=1}^{nh} \Sigma_{i=1}^{ns} [\Sigma_{j=1}^{nu} t_s \cdot c_{jk} u_{jik}(\theta_{HL})] \qquad \text{Eq. (2)}$$

where $n_h$ is the number of time steps k in the prediction time period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \max_{n_h}(u_{elec}(\theta_{HL}), u_{max,ele}) \qquad \text{Eq. (3)}$$

where $w_d$ is a weighting term, $c_{demand}$ is the demand cost, and the max( ) term selects the peak electricity use during the applicable demand charge period.

In some embodiments, the high level optimization performed by the high level optimizer 440 is the same or similar to the high level optimization process described in U.S. patent application Ser. No. 14/634,609 filed Feb. 27, 2015 and titled "High Level Central Plant Optimization," which is incorporated by reference herein.

The low level optimizer 450 receives the Q allocation data 442 from the high level optimizer 440, and determines operating parameters (e.g., capacities) of the HVAC devices of the HVAC system 100. In one or more embodiments, the low level optimizer 450 includes an equipment allocator 460, a state predictor 470, and a power estimator 480. Together, these components operate to determine a set of operating parameters, for example, rendering reduced power consumption of the HVAC system 100 for a given set of thermal energy loads indicated by the Q allocation data 442, and generate operating parameter data indicating the determined set of operating parameters. In some embodiments, the low level optimizer 450 includes different, more, or fewer components, or includes components in different arrangements than shown in FIG. 4.

In one configuration, the equipment allocator 460 receives the Q allocation data 442 from the high level optimizer 440, and generates candidate operating parameter data 462 indicating a set of candidate operating parameters of HVAC devices of the HVAC system 100. The state predictor 470 receives the candidate operating parameter data 462 and predicts thermodynamic states of the HVAC system 100 at various locations for the set of candidate operating parameters. The state predictor 470 generates state data 474 indicating the predicted thermodynamic states, and provides the state data 474 to the power estimator 480. The power estimator 480 predicts, based on the state data 474, total power consumed by the HVAC system 100 operating according to the set of candidate operating parameters, and generates the power estimation data 482 indicating the predicted power consumption. The equipment allocator 460 may repeat the process with different sets of candidate operating parameters to obtain predicted power consumptions of the HVAC system 100 operating according to different sets of candidate operating parameters, and select a set of operating parameters rendering lower power consumption. The equipment allocator 460 may generate the operating parameter and power estimation data 448 indicating (i) the selected set of operating parameters and (ii) predicted power consumption of the power plant when operating according to the selected set of operating parameters, and provide the operating parameter and power estimation data 448 to the high level optimizer 440.

The equipment allocator 460 is a component that interfaces with the high level optimizer 440. In one aspect, the equipment allocator 460 receives the Q allocation data, and determines a candidate set of operating parameters of HVAC devices of the HVAC system 100. For example, the equipment allocator 460 determines that a first chiller is assigned to operate with a first range of thermal energy load and a second chiller is assigned to operate with a second range of thermal energy load based on the Q allocation data. In this example, the equipment allocator 460 may determine that operating parameters (e.g., between 30% to 50% capacity) of the first chiller can achieve the first range of thermal energy load and operating parameters (e.g., between 60~65% capacity) of the second chiller can achieve the second range of thermal energy load. From different combinations of operating parameters of the first chiller and the second chiller, the equipment allocator 460 selects a candidate set of operating parameters (e.g., 45% capacity of the first chiller and 60% capacity of the second chiller). Additionally, the equipment allocator 460 generates the candidate operating parameter data 462 indicating the selected candidate set of operating parameters, and provides the candidate operating parameter data 462 to the state predictor 470.

The state predictor 470 predicts an operating condition of the HVAC system 100 based on a set of operating parameters of the HVAC system 100 as indicated by the candidate operating parameter data 462. The operating condition of the HVAC system 100 includes thermodynamic states at various locations of the HVAC system 100. Examples of thermodynamic states include input pressure value, output pressure value, input mass flow value, output mass flow value, input enthalpy value, output enthalpy value, etc. In one approach, predicting thermodynamic states of the HVAC system 100 includes applying the set of operating parameters to a linear solver and a non-linear solver. Generally, the non-linear solver consumes a large amount of resources (e.g., processor threads and storage capacity) to obtain a solution. In one or more embodiments, the state predictor 470 reduces a number of unknown thermodynamic states to be predicted based on schematic arrangements of HVAC devices of the HVAC system 100, and may further reduce the number of unknown thermodynamic states to be predicted by propagating known thermodynamic states based on the operating parameters using the linear solver. Advantageously, a fewer number of unknown thermodynamic states can be determined by the non-linear solver, thereby improving efficiency of predicting the thermodynamic states for the set of operating parameters. The state predictor 470 generates state data 474 indicating the predicted thermodynamic states for the candidate set of operating parameters, and provides the state data 474 to the power estimator 480.

The power estimator 480 predicts power consumed by the HVAC system 100 based on the state data 474. In one approach, the power estimator 480 determines, for each HVAC device, a predicted power consumption based on thermodynamic states (e.g., pressure values, mass flow values, enthalpy values, etc.) and an operating parameter (e.g., capacity) of the HVAC device. In addition, the power estimator 480 may add power consumptions of the HVAC devices of the HVAC system 100 to obtain a total power consumption of the HVAC system 100. The power estimator 480 generates the power estimation data 482 indicating the total power consumption of the HVAC system 100, power consumption of each HVAC device, or any combination of them, and provides the power estimation data 482 to the equipment allocator 460.

In some embodiments, the equipment allocator 460 compares predicted power consumptions of the HVAC system 100 for multiple sets of operating parameters, and selects a set of operating parameters for operating the HVAC system 100. In one approach, the equipment allocator 460 selects, from the multiple sets of operating parameters, the set of operating parameters rendering the lowest power consumption. Hence, the HVAC system 100 operating based on the set of operating parameters determined by the equipment allocator 460 benefits from reduced power consumption. The equipment allocator 460 may generate the operating parameter and power estimation data 448 indicating the set of operating parameters to operate HVAC devices of the HVAC system 100, predicted power consumptions when operating the HVAC system 100 according to the set of operating parameters, or any combination of them, and provide the operating parameter and power estimation data 448 to the high level optimizer 440.

In one aspect, the state predictor 470 and the power estimator 480 cannot predict thermodynamic states and power consumption of HVAC devices operating according to time dependent deferred load. For example, during periods of low load, chillers are often cycled in order to meet the cooling loads of the connected buildings. A chiller may be shut off or operate at the minimum load, once the chilled water temperature reaches set point (e.g., 40° F.). The chiller may be left off until the return water temperature reaches a certain value (e.g., 55° F.). The high level optimizer 440 is able to allocate load to be consumed out of the thermal mass of the water loop, thereby shifting load to an earlier or later time in the horizon. However, the state predictor 470 may operate independent of time of operation of the HVAC system, and may not accommodate a change in loads during different time periods. Particularly, the state predictor 470 may operate independent of time in terms of temperature, and instead utilize a flow, ω, to calculate energy consumptions. The generic equation for this process is shown below.

$$\omega \rho C_p \Delta T = \dot{Q}_l, \quad \text{Eq. (4)}$$

where ω is the flow of the water, ρ is density of water, $C_p$ is the specific heat capacity of water, and $\Delta T$ is the temperature difference from outlet to inlet. The operating condition of time dependent HVAC devices in the loop results in a change in temperature at different times.

In some embodiments, the equipment allocator 460 allows prediction of thermal energy states and power consumption of the HVAC system according to time dependent thermal energy load. In one implementation, the equipment allocator 460 obtains the Q allocation data 442 indicating time dependent thermal energy load of the energy plant, and determines, for a time period, an operating state of the energy plant based on the Q allocation data 442. For example, the equipment allocator 460 determines that the HVAC system is operating in one of predefined operating states including a primary state, a deferred load state, and an off-state. The equipment allocator 460 may obtain predicted power consumption of the energy plant according to the determined operating state.

In the primary state, a primary equipment (also referred to as "a supply device") of the energy plant is enabled during a time period. The primary equipment may be an equipment or a supply device that produces resource (Chilled Water, Hot Water) of a loop. In the primary state, the equipment allocator may generate the candidate operating parameter data 462 and provide the candidate operating parameter data 462 to the state predictor 470 to obtain predicted power consumption through the power estimator 480, according to the candidate operating parameter data 462.

In the deferred load state, the primary equipment is disabled, but a deferred load may be allocated. For the deferred load state, the equipment allocator 460 may predict an average flow through a loop of the energy plant due to the deferred load, and predict the power consumption of the energy plant according to the predicted average flow. Example process of predicting the power consumption is provided in detail below with respect to FIG. 6.

In the off-state, the primary equipment of the energy plant is disabled without any deferred load. Hence, a portion the HVAC system or HVAC devices of the HVAC system coupled to the primary equipment of the energy plant may be determined to be non-operational. Thus, the equipment allocator 460 may determine that the power consumption of the portion of the HVAC system or the HVAC devices coupled to the non-operational primary equipment is zero.

Figure 5:
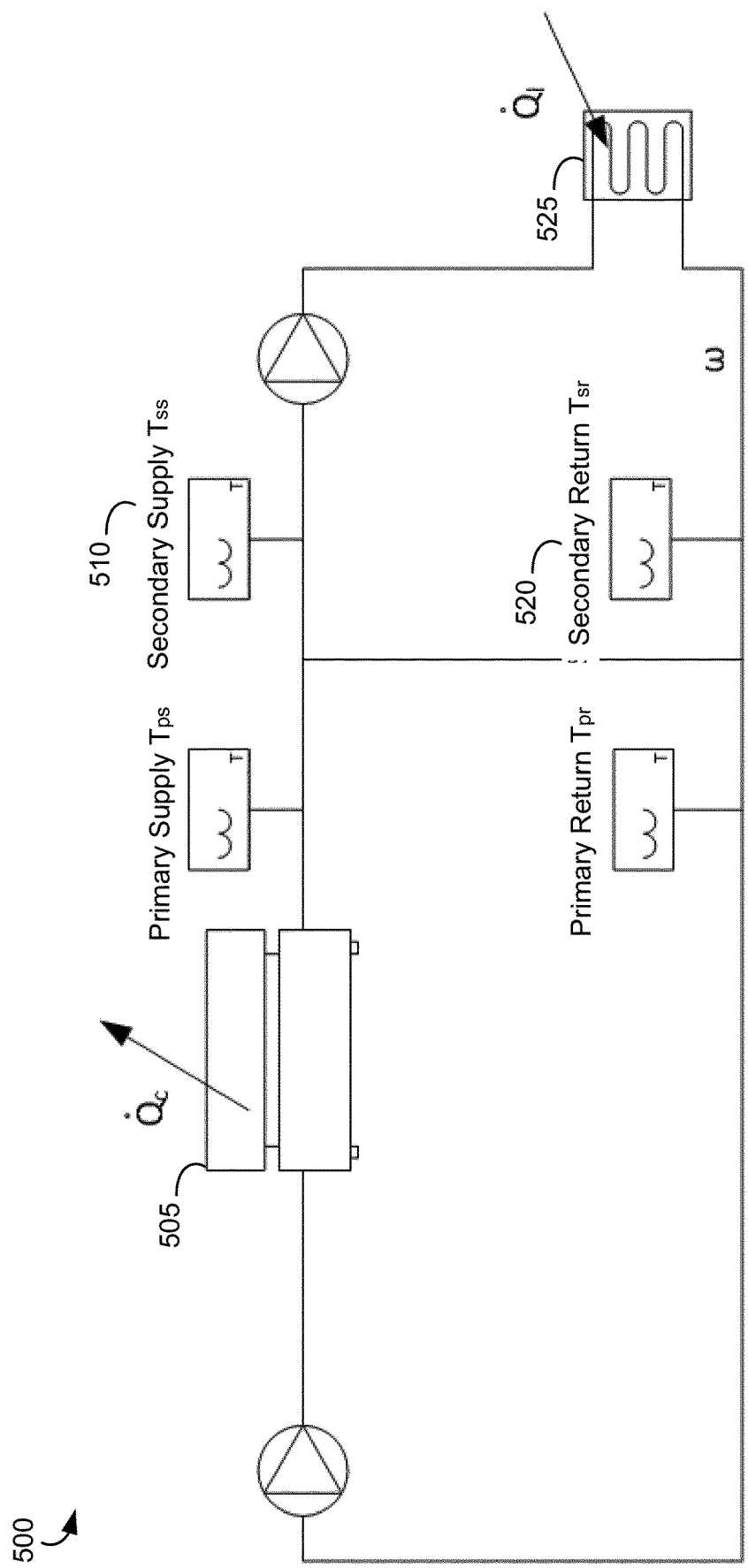
FIG. 5 is a schematic representation of an HVAC system operating in a primary state, according to some embodiments.

Referring to FIG. 5, illustrated is an example schematic representation 500 of an HVAC system operating in a primary state, according to some embodiments. In the example shown in FIG. 5, the primary equipment 505 is coupled to the load coil 525. In this configuration, the primary equipment 505 supplies resource (e.g., gas or liquid) to the load coil 525. In the primary state, where primary equipment 505 is present, the allocation to the Water Mass Storage can be aggregated to the load coil 525, creating either a higher or lower load based on direction of charge. This aggregated load can be solved similarly to a normal plant, and will have a net energy change of '0,' meaning the production will equal the consumption. In one approach, a power consumption may be calculated by determining a temperature difference between the inlet 510 and the outlet 520 to determine a flow through the load coil 525. The power consumption may be determined based on the flow through the load coil 525.

Figure 6:
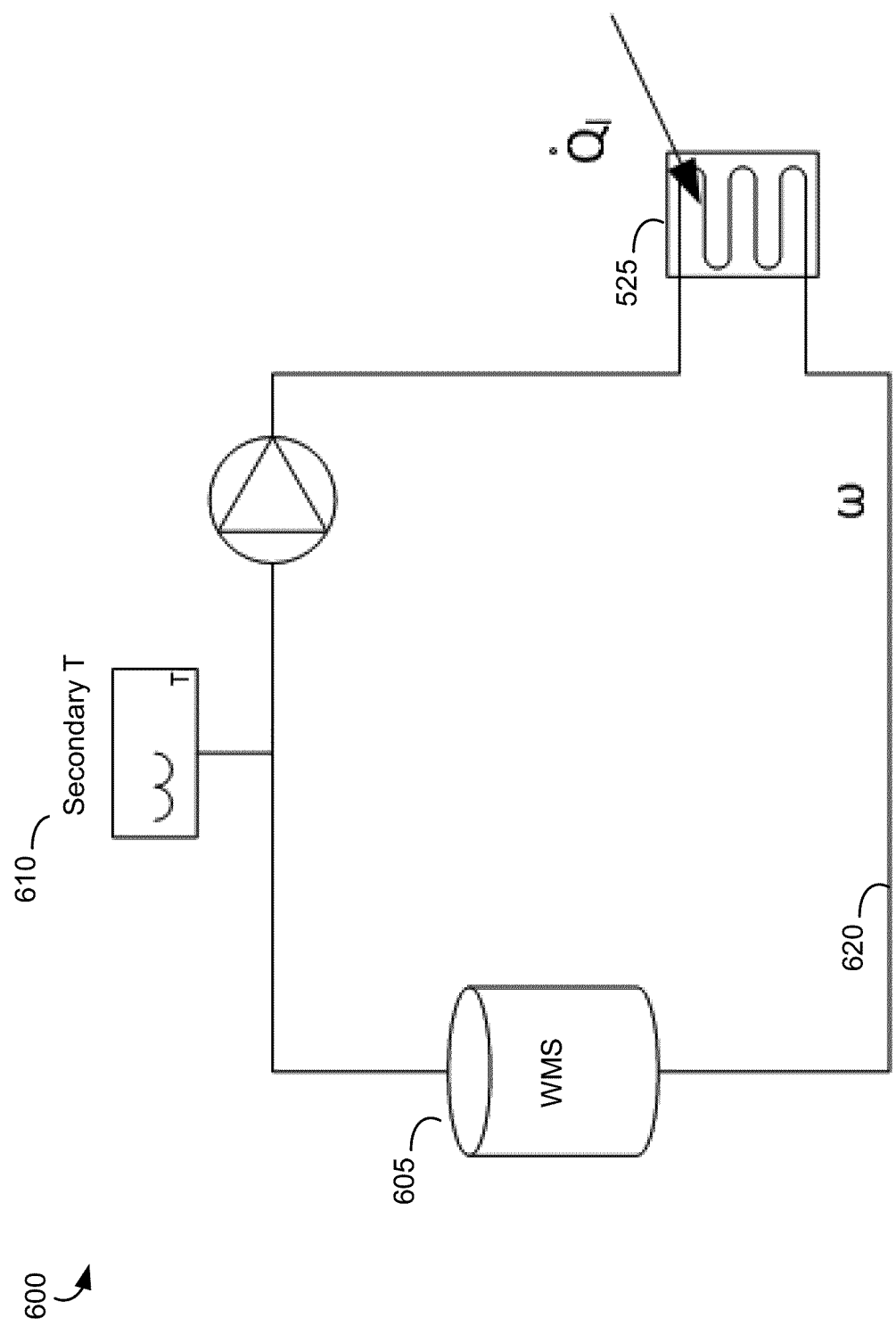
FIG. 6 is a schematic representation of the HVAC system of FIG. 5 operating in a deferred load state, according to some embodiments.

Referring to FIG. 6, an example schematic representation 600 of an HVAC system operating in a deferred load state is shown, according to some embodiments. A deferred load state is when there is a water mass storage or a deferred load allocation with no primary equipment. Since this operating state lacks any primary equipment, there is no source of a temperature difference $\Delta T$ in the loop, rendering steady state calculations by the state predictor 470 to be impossible. In this operating state, the topology of the plant may be modified to include a computer generated model of a dummy device 605 (e.g., water mass storage) in place of the primary equipment 505 as shown in FIG. 6.

By adding the computer generated model of the dummy device 605 as shown in FIG. 6, a loop between the model of the dummy device 605 and the load coil 525 is formed. To calculate a predicted flow through the load coil 525, $mC_p$ approximated by, for example, the high level optimizer 440 may be applied. An approximation of the equivalence between the dynamic load predicted by the high level optimizer 440 and the static load for the low level optimizer 450 is shown below.

$$mC_p\dot{T} = \dot{Q} = \omega \rho C_p \Delta T \quad \text{Eq. (5)}$$

The time dependent aspect of $\dot{T}$ can be added by interpreting the inlet 620 temperature of the water mass storage (WMS) 605 as the next predicted temperature. This can be shown with the following equations.

$$\dot{T} = \lim_{dt \to 0} T_t - T_{t+dt} \quad \text{Eq. (6)}$$

$$\Delta T = T_t - T_{t+dt} \quad \text{Eq. (7)}$$

In Eq. (7), dt is the time between dispatches. Using this equivalence, the $mC_p$ value calculated by the high level optimizer 440 can be scaled to a value appropriate for low level optimizer 450. For a regular dispatch, this means it can be treated as a 15 minute increment, with off clock dispatches providing less optimal results due to variable time steps. As operational data is collected, the scaling factor can be adjusted to produce results realistic to the plant. This scaled value can be used in the following equation to find an intermediate temperature.

$$T_{in} = -\frac{Q}{mC_p} + T_{Secondary} \quad \text{Eq. (8)}$$

where $T_{Secondary}$ is the temperature at the outlet 610 of the dummy device 605 (or inlet of the load coil 525). According to a temperature difference between inlet and outlet or a difference between $T_{in}$ and $T_{Secondary}$, an average flow for the loop over the dispatch period can be predicted. Moreover, power consumption of the pump can be predicted based on the average flow.

$$\text{Power} = f(\dot{\omega}) \quad \text{Eq. (9)}$$

where $f(\dot{\omega})$ is a non-linear function dependent on the flow $\dot{\omega}$.

In some embodiments, the low level optimizer 450 predicts the flow of gas or liquid according to the following equation:

$$\dot{\omega} = m/\rho \quad \text{Eq. (10)}$$

In this embodiment, the low level optimizer 450 may determine the flow of gas or liquid without determining a temperature difference.

The off-state of a plant is an operating state, in which there is no load allocated to loop storage or primary equipment. In this scenario, the plant may be assumed to be nonoperational, with no flow in any pipes. The power consumption in this scenario may be determined to be zero for HVAC devices coupled to the primary equipment.

Figure 7:
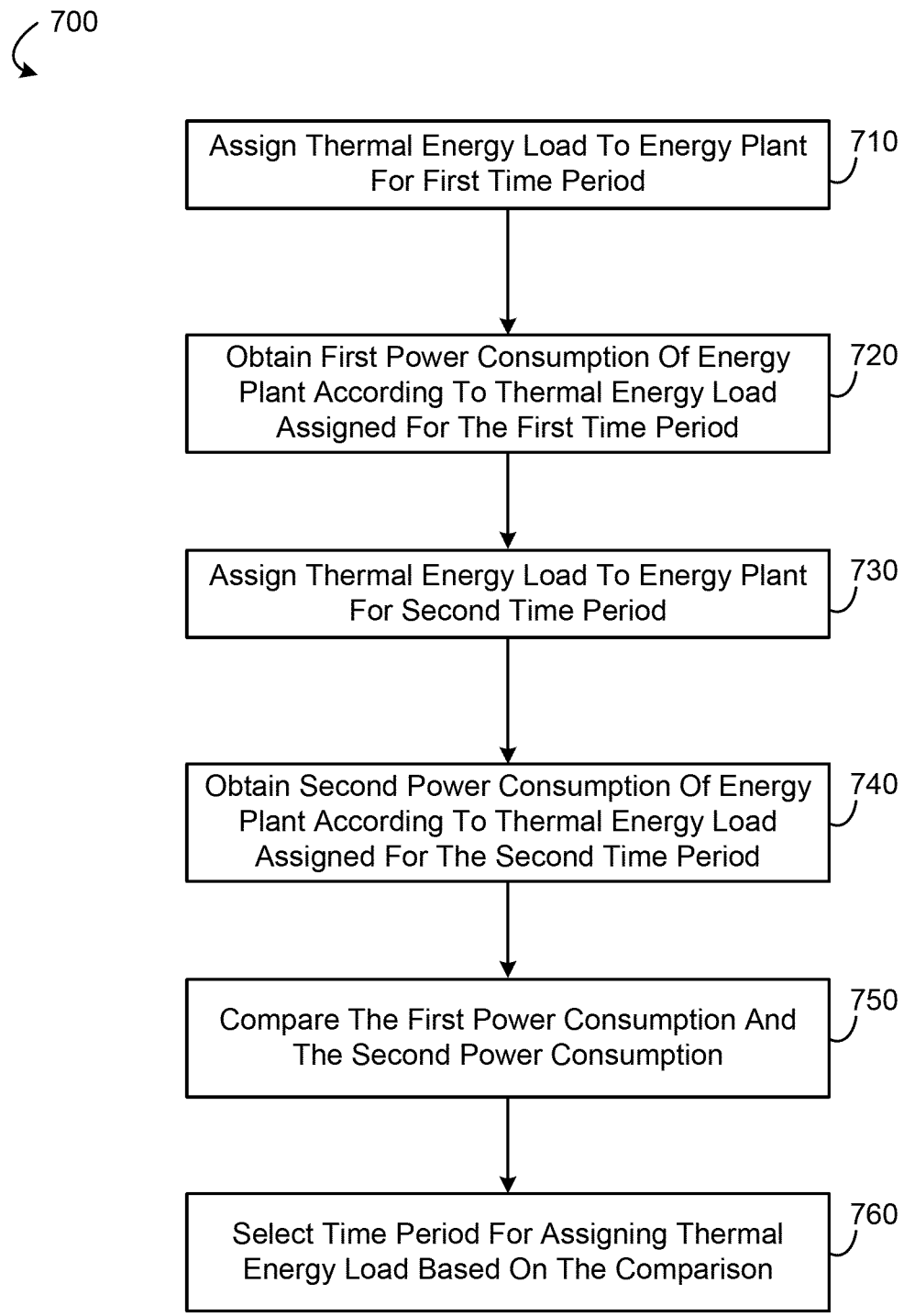
FIG. 7 is a flow chart illustrating a process for deferring load of the HVAC system of FIGS. 4-5, according to some embodiments.

Referring to FIG. 7, a flow chart illustrating a process 700 for deferring load of an HVAC system is shown, according to some embodiments. The process 700 may be performed by the high level optimizer 440 of FIG. 4. In some embodiments, the process 700 may be performed by other entities. In some embodiments, the process 700 may include additional, fewer, or different steps than shown in FIG. 7.

The high level optimizer 440 assigns a thermal energy load to an energy plant for a first time period (step 710). The high level optimizer 440 obtains a first power consumption of the energy plant according to thermal energy load assigned for the first time period (step 720). The high level optimizer 440 assigns the thermal energy load to the energy plant for a second time period (step 730). The high level optimizer 440 obtains a second power consumption of the energy plant according to thermal energy load assigned for the second time period (step 740). In one approach, the high level optimizer 440 generates Q allocation data 442 indicating the thermal energy load and the assigned time period, and provides the Q allocation data 442 to the low level optimizer 450. In return, the high level optimizer 440 receives operating parameter and power estimation data 448 indicating operating parameters and predicted power consumption of the energy plant operating according to the operating parameters at the assigned time period.

The high level optimizer 440 compares the first power consumption and the second power consumption indicated by the operating parameter and power estimation data 448 (step 750). The high level optimizer 440 selects a time period for assigning the thermal energy load based on the comparison of the power consumptions (step 760). In one approach, the high level optimizer 440 selects a time period that renders a lower power consumption. The high level optimizer 440 may operate the HVAC devices at the assigned time period according to operating parameters of the HVAC devices determined by the low level optimizer 450 for the assigned time period.

Figure 8:
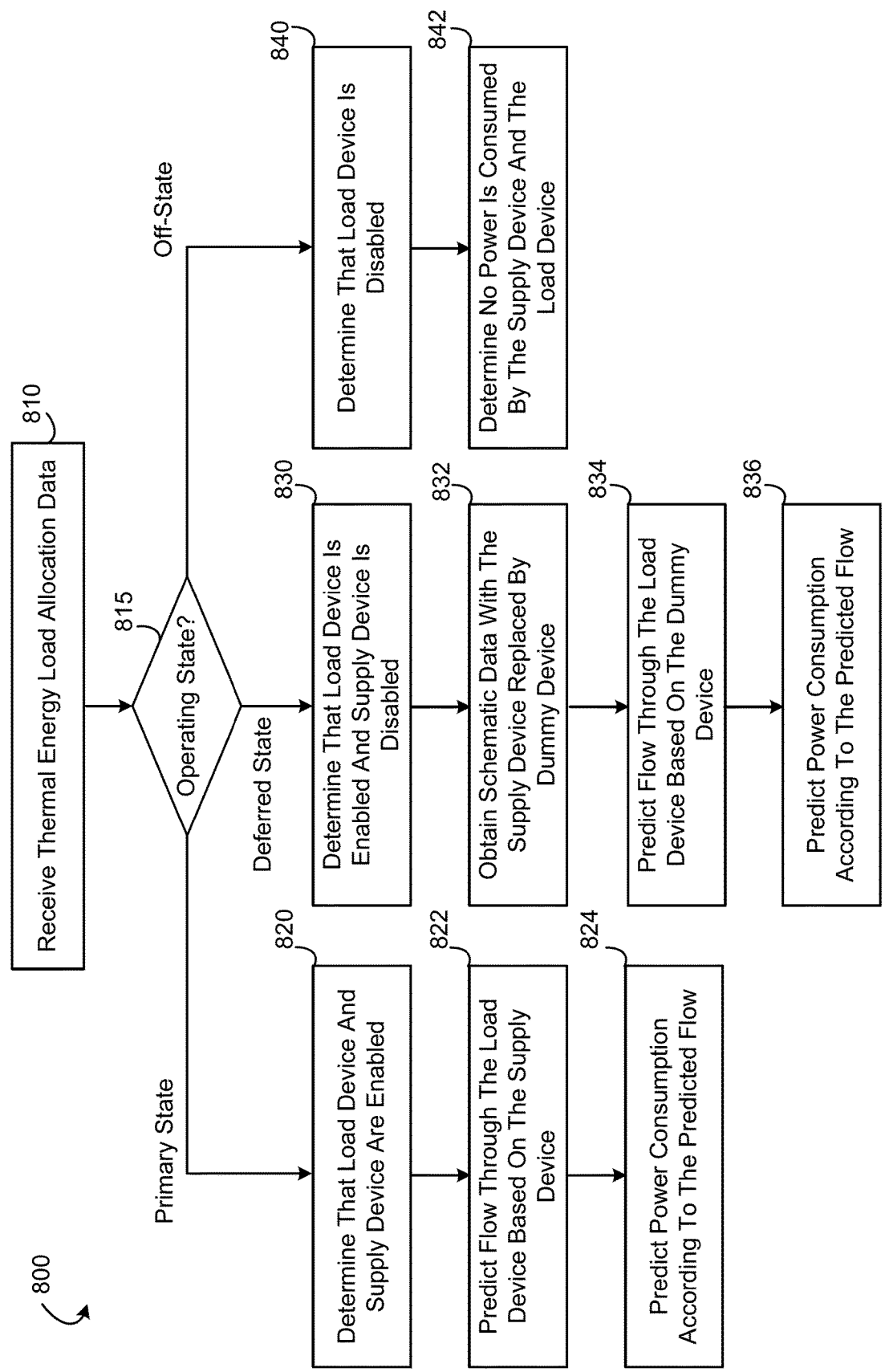
FIG. 8 is a flow chart illustrating a process for determining power consumption of the HVAC system of FIGS. 4-5 with time deferred load, according to some embodiments.

Referring to FIG. 8, a flow chart illustrating a process 800 for determining power consumption of an HVAC system with time deferred load is shown, according to some embodiments. The process 800 may be performed by the low level optimizer 450 of FIG. 4. In some embodiments, the process 800 may be performed by other entities. In some embodiments, the process 800 may include additional, fewer, or different steps than shown in FIG. 8.

The low level optimizer 450 receives thermal energy load allocation data 442, for example, from the high level optimizer 440 (step 810). The low level optimizer 450 determines an operating state of the energy plant (step 820). The low level optimizer 450 may determine the operating state according to a time period assigned by the high level optimizer 440 as indicated by the thermal energy load allocation data 442. Specifically, the low level optimizer 450 determines the operating state according to operating status of availability or cyclic behavior of HVAC devices or load device at the time period assigned. In one approach, the low level optimizer 450 determines the operating state from predefined operating states. In one example, the predefined operating states include a primary state, a deferred load state, and an off-state.

In the primary state, the low level optimizer 450 determines that a load device is enabled and a supply device (e.g., primary equipment) supplying resource to the load device is enabled (step 820). In the primary state, the low level optimizer 450 predicts the flow of gas or liquid through the load device based on the supply device (step 822). For example, the low level optimizer 450 obtains a temperature difference between inlet and outlet of the load device and predicts the flow of gas or liquid through the load device based on the temperature difference. The low level optimizer 450 predicts power consumption of the predicted flow of gas or liquid (step 824).

In the deferred state, the low level optimizer 450 determines that the load device is enabled but the supply device supplying resource to the load device is disabled (step 830). In the primary state, because the supply device supplying resource to the load device is disabled, steady state calculation of states of the devices may not be feasible. The low level optimizer 450 obtains a schematic data indicating schematic relationships of components of the energy plant (step 832). The schematic data of the energy plant may include (i) a computer generated model of a dummy device (e.g., water mass storage) in place of the disabled supply device and (ii) a computer generated model of the load device. Based on the schematic data with the computer generated model of the dummy device, the low level optimizer 450 predicts the flow of gas or liquid through the load device (step 834). For example, the low level optimizer 450 obtains a temperature difference between inlet and outlet of the load device and predicts the flow of gas or liquid through the load device based on the temperature difference. The low level optimizer 450 predicts power consumption of the predicted flow of gas or liquid (step 836).

In the deferred state, the low level optimizer 450 determines that the load device is enabled but the supply device supplying resource to the load device is disabled (step 840). The low level optimizer 450 determines that no power is consumed by the supply device and the load device (step 842).

The low level optimizer 450 may predict power consumptions of the HVAC devices operating according to different sets of operating parameters at different operating states, and determine a set of operating parameters rendering a lower power consumption. The low level optimizer 450 may generate operating parameter and power estimation data 448 and provide it to the high level optimizer 440.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an energy plant, the controller comprising:
a processing circuit comprising a processor and memory storing instructions executed by the processor, the processing circuit configured to:
obtain thermal energy load allocation data indicating time dependent thermal energy load of the energy plant;
use a relationship between the time dependent thermal energy load and a change in temperature of a fluid within a fluid loop represented by a dummy device to determine the change in temperature of the fluid based on the time dependent thermal energy load;
use an equivalence between the change in temperature of the fluid within the fluid loop and a change in temperature across the dummy device and a model that relates the time dependent thermal energy load to a flow rate of the fluid within the fluid loop to determine the flow rate of the fluid within the fluid loop;
determine operating parameters of the energy plant according to the flow rate and the fluid within the fluid loop;
operate the energy plant according to the operating parameters; and
wherein the processing circuit is configured to determine, for a time period, an operating state of the energy plant from a plurality of predefined operating states based on the thermal energy load allocation data, wherein the plurality of predefined operating states include at least one of:
a primary state, in which a supply device of the energy plant is enabled and a deferred load is allocated during the time period;
a deferred state, in which the supply device of the energy plant is disabled and the deferred load is allocated during the time period;
and an off-state, in which no load is allocated during the time period.

2. The controller of claim 1, wherein the processing circuit is further configured to:
predict a power consumption of the energy plant according to the determined operating state.

3. The controller of claim 2, wherein, responsive to determining that the operating state is the primary state, the processing circuit is configured to predict the power consumption of the energy plant according to a power consumption of the supply device.

4. The controller of claim 2, wherein, responsive to determining that the operating state is the deferred state, the processing circuit is configured to:
determine the flow rate of the fluid through a load device to consume the deferred load during the time period; and
predict the power consumption according to the determined flow rate.

5. The controller of claim 4, wherein the processing circuit is configured to:

generate a schematic data of the energy plant, the schematic data including a model of the dummy device in place of the supply device and a model of a load device to consume the deferred load;
determine the change in temperature in a loop formed by the model of the dummy device and the model of the load device; and
determine the flow rate, according to the determined change in temperature.

6. The controller of claim 2, wherein, responsive to determining that the operating state is the off-state, the processing circuit is configured to:
determine that the supply device does not consume power during the time period.

7. The controller of claim 2, wherein the processing circuit is further configured to:
determine, for another time period, another operating state of the energy plant from the plurality of predefined operating states based on the thermal energy load allocation data; and
predict another power consumption of the energy plant according to the another operating state.

8. The controller of claim 7, wherein the processing circuit is further configured to:
compare the power consumption and the another power consumption; and
assign the time dependent thermal energy load to the energy plant for one of the time period and the another time period associated with a lower power consumption.

9. A method of operating an energy plant, the method comprising:
obtaining thermal energy load allocation data indicating time dependent thermal energy load of the energy plant;
using a relationship between the time dependent thermal energy load and a change in temperature of a fluid within a fluid loop represented by a dummy device to determine the change in temperature of the fluid based on the time dependent thermal energy load;
using an equivalence between the change in temperature of the fluid within the fluid loop and a change in temperature across the dummy device and a model that relates the time dependent thermal energy load to a flow rate of the fluid within the fluid loop to determine the flow rate of the fluid within the fluid loop;
determining operating parameters of the energy plant based on the flow rate of the fluid within the fluid loop;
operating the energy plant according to the operating parameters; and
determining, for a time period, an operating state of the energy plant from a plurality of predefined operating states based on the thermal energy load allocation data, wherein the plurality of predefined operating states include at least one of:
a primary state, in which a supply device of the energy plant is enabled and a deferred load is allocated during the time period;
a deferred state, in which the supply device of the energy plant is disabled and the deferred load is allocated during the time period;
and an off-state, in which no load is allocated during the time period.

10. The method of claim 9, further comprising:
predicting a power consumption of the energy plant according to the determined operating state.

11. The method of claim 10, further comprising:
predicting the power consumption of the energy plant according to a power consumption of the supply device, responsive to determining that the operating state is the primary state.

12. The method of claim 10, responsive to determining that the operating state is the deferred state, the method further comprising:
determining the flow rate of the fluid through a load device to consume the deferred load during the time period; and
predicting the power consumption according to the determined flow rate.

13. The method of claim 12, further comprising:
generating a schematic data of the energy plant, the schematic data including a model of the dummy device in place of the supply device and a model of a load device to consume the deferred load;
determine the change in temperature in a loop formed by the model of the dummy device and the model of the load device; and
determine the flow rate, according to the determined change in temperature.

14. The method of claim 10, responsive to determining that the operating state is the off-state, the method further comprising:
determining that the supply device does not consume power during the time period.

15. The method of claim 10, further comprising:
determining, for another time period, another operating state of the energy plant from the plurality of predefined operating states based on the thermal energy load allocation data; and
predicting another power consumption of the energy plant according to the another operating state.

16. The method of claim 15, further comprising:
comparing the power consumption and the another power consumption; and
assigning the time dependent thermal energy load to the energy plant for one of the time period and the another time period associated with a lower power consumption.

17. A non-transitory computer readable medium comprising instructions when executed by a processor cause the processor to:
obtain thermal energy load allocation data indicating time dependent thermal energy load of an energy plant;
use a relationship between the time dependent thermal energy load and a change in temperature of a fluid within a fluid loop represented by a dummy device to determine the change in temperature of the fluid based on the time dependent thermal energy load;
use an equivalence between the change in temperature of the fluid within the fluid loop and a change in temperature across the dummy device and a model that relates the time dependent thermal energy load to a flow rate of the fluid within the fluid loop to determine the flow rate of the fluid within the fluid loop;
determine operating parameters of the energy plant based on the flow rate of the fluid within the fluid loop;
operate the energy plant according to the operating parameters; and
wherein the processor is configured to determine, for a time period, an operating state of the energy plant from a plurality of predefined operating states based on the thermal energy load allocation data, wherein the plurality of predefined operating states include:

a primary state, in which a supply device of the energy plant is enabled and a deferred load is allocated during the time period;

a deferred state, in which the supply device of the energy plant is disabled and the deferred load is allocated during the time period;

and an off-state, in which no load is allocated during the time period.

* * * * *